(12) United States Patent
Qiu et al.

(10) Patent No.: US 11,663,986 B2
(45) Date of Patent: *May 30, 2023

(54) POWER SAVING DISPLAY HAVING IMPROVED IMAGE QUALITY

(71) Applicant: Intel Corporation, Santa Clara, CA (US)

(72) Inventors: Junhai Qiu, Portland, OR (US); Nandini Mahendran, Santa Clara, CA (US); Ajit Joshi, Portland, OR (US); Shravan Kumar Belagal Math, Bangalore (IN); Sherine Abdelhak, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,548

(22) Filed: May 3, 2022

(65) Prior Publication Data

US 2022/0366861 A1 Nov. 17, 2022

Related U.S. Application Data

(63) Continuation of application No. 17/186,377, filed on Feb. 26, 2021, now Pat. No. 11,348,538, which is a (Continued)

(51) Int. Cl.
*G09G 5/00* (2006.01)
*G09G 3/34* (2006.01)
(Continued)

(52) U.S. Cl.
CPC ......... *G09G 3/3406* (2013.01); *G06F 1/3265* (2013.01); *G09G 3/2003* (2013.01);
(Continued)

(58) Field of Classification Search
CPC ............... G09G 3/3406; G09G 3/2003; G09G 2320/02; G09G 2320/0271; G09G 2330/021; G06F 1/3265; Y02D 10/00
See application file for complete search history.

(56) References Cited

U.S. PATENT DOCUMENTS

| 7,924,261 B2 | 4/2011 | Kerofsky |
| 8,194,028 B2 | 6/2012 | Fletcher et al. |

(Continued)

OTHER PUBLICATIONS

United States Patent and Trademark Office, "Notice of Allowance and Fee(s) Due," issued in connection with U.S. Appl. No. 16/456,125, dated Oct. 15, 2020, 28 pages.
(Continued)

*Primary Examiner* — Adam J Snyder
(74) *Attorney, Agent, or Firm* — Hanley, Flight & Zimmerman, LLC

(57) ABSTRACT

The present disclosure is directed to systems and methods of optimizing display image quality on display devices having a plurality of display power modes. An example apparatus includes processor circuitry to execute instructions to: determine a baseline allowable percentage of distorted pixels for a power mode of a display; determine a baseline first relationship between an original pixel value and a boosted pixel value for the power mode; determine a baseline second relationship based on the baseline allowable percentage and the baseline first relationship; select a plurality of test distorted pixel percentages; determine, for respective selected test distorted pixel percentages, a corresponding test relationship between an original pixel color value distribution and a boosted pixel color value distribution based on the baseline second relationship; determine, for respective test relationships, a respective test peak signal to noise ratio (PSNR); determine, for the respective test PSNRs, respective values indicative of the change in image quality
(Continued)

for the test distorted pixel percentages; and select, as the operating distorted original pixel percentage value, one of the test distorted pixel percentages based on the values.

19 Claims, 4 Drawing Sheets

Related U.S. Application Data continuation of application No. 16/242,603, filed on Jan. 8, 2019, now Pat. No. 10,971,085.

(51) Int. Cl.
*G09G 3/20* (2006.01)
*G06F 1/3234* (2019.01)

(52) U.S. Cl.
CPC . *G09G 2320/02* (2013.01); *G09G 2320/0271* (2013.01); *G09G 2330/021* (2013.01); *Y02D 10/00* (2018.01)

(56) References Cited

U.S. PATENT DOCUMENTS

| | | | |
|---|---|---|---|
| 8,704,844 B2 | 4/2014 | Fleck et al. | |
| 10,937,358 B2 | 3/2021 | Qiu et al. | |
| 10,971,085 B2* | 4/2021 | Qiu | G09G 3/2003 |
| 11,289,006 B2 | 3/2022 | Qiu et al. | |
| 11,348,538 B2* | 5/2022 | Qiu | G06F 1/3265 |
| 2004/0113906 A1 | 6/2004 | Lew et al. | |
| 2006/0119612 A1 | 6/2006 | Kerofsky et al. | |
| 2006/0119613 A1 | 6/2006 | Kerofsky | |
| 2006/0262111 A1 | 11/2006 | Kerofsky | |
| 2006/0274026 A1 | 12/2006 | Kerofsky | |
| 2007/0146236 A1 | 6/2007 | Kerofsky et al. | |
| 2007/0291048 A1 | 12/2007 | Kerofsky | |
| 2008/0079756 A1 | 4/2008 | Akai et al. | |
| 2008/0272999 A1 | 11/2008 | Kurokawa et al. | |
| 2009/0021455 A1 | 1/2009 | Miller et al. | |
| 2009/0066715 A1 | 3/2009 | Chen | |
| 2009/0109170 A1 | 4/2009 | Kwon et al. | |
| 2009/0109232 A1 | 4/2009 | Kerofsky | |
| 2009/0140970 A1 | 6/2009 | Kerofsky | |
| 2009/0167671 A1 | 7/2009 | Kerofsky | |
| 2009/0284461 A1 | 11/2009 | Hsu et al. | |
| 2010/0013750 A1 | 1/2010 | Kerofsky et al. | |
| 2011/0141244 A1 | 6/2011 | Vos et al. | |
| 2011/0242139 A1 | 10/2011 | Toshima et al. | |
| 2011/0298843 A1 | 12/2011 | Hajjar et al. | |
| 2012/0007880 A1 | 1/2012 | Huang et al. | |
| 2012/0056907 A1 | 3/2012 | Lee et al. | |
| 2012/0075353 A1 | 3/2012 | Dong et al. | |
| 2012/0218313 A1 | 8/2012 | Chiou et al. | |
| 2013/0050296 A1 | 2/2013 | Plut | |
| 2014/0267325 A1 | 9/2014 | Jiang et al. | |
| 2019/0147806 A1 | 5/2019 | Qiu et al. | |
| 2020/0074944 A1 | 3/2020 | Kang | |
| 2020/0126471 A1 | 4/2020 | Qiu et al. | |
| 2021/0183322 A1 | 6/2021 | Qiu et al. | |

OTHER PUBLICATIONS

United States Patent and Trademark Office, "Corrected Notice of Allowability," issued in connection with U.S. Appl. No. 16/456,125, dated Jan. 29, 2021, 2 pages.

United States Patent and Trademark Office, "Non-Final Office Action," issued in connection with U.S. Appl. No. 16/242,603, dated Apr. 14, 2020, 10 pages.

United States Patent and Trademark Office, "Notice of Allowance and Fee(s) Due," issued in connection with U.S. Appl. No. 16/242,603, dated Aug. 3, 2020, 6 pages.

United States Patent and Trademark Office, "Notice of Allowance and Fee(s) Due," issued in connection with U.S. Appl. No. 16/242,603, dated Nov. 18, 2020, 6 pages.

United States Patent and Trademark Office, "Corrected Notice of Allowability," issued in connection with U.S. Appl. No. 17/186,377, dated Feb. 16, 2022, 5 pages.

United States Patent and Trademark Office, "Notice of Allowance and Fee(s) Due," issued in connection with U.S. Appl. No. 17/186,377, dated Feb. 2, 2022, 8 pages.

United States Patent and Trademark Office, "Non-Final Office Action," issued in connection with U.S. Appl. No. 17/186,377, dated Aug. 11, 2021, 10 pages.

United States Patent and Trademark Office, "Notice of Allowance and Fee(s) Due," issued in connection with U.S. Appl. No. 17/188,807, dated Nov. 17, 2021, 25 pages.

\* cited by examiner

POWER SAVING DISPLAY HAVING IMPROVED IMAGE QUALITY

RELATED APPLICATION

This patent arises from a continuation of U.S. patent application Ser. No. 17/186,377, which was filed on Feb. 26, 2021, which is a continuation of U.S. patent application Ser. No. 16/242,603, which was filed on Jan. 8, 2019. U.S. patent application Ser. No. 17/186,377 and U.S. patent application Ser. No. 16/242,603 is hereby incorporated herein by reference in their entireties. Priority to U.S. patent application Ser. No. 17/186,377 and U.S. patent application Ser. No. 16/242,603 is hereby claimed.

TECHNICAL FIELD

The present disclosure relates to display devices, specifically display devices having power saving features.

BACKGROUND

Modern display devices, particularly liquid crystal display (LCD) devices and light emitting diode (LED) devices rely upon a back-light supplying fairly intense back-illumination to a color panel to produce visible output. The power consumed by such back-lights is considerable, particularly for handheld and portable devices such as smartphones, tablet computers, laptop computers, wearable computers, and similar portable processor-based devices. A class of power saving technologies includes selectively limiting the power consumption of display backlights. Such power saving technologies, while somewhat effective typically compromise the quality of the display image. Each reduction in luminous output causes distortion of a percentage of the display image.

Figure 1:
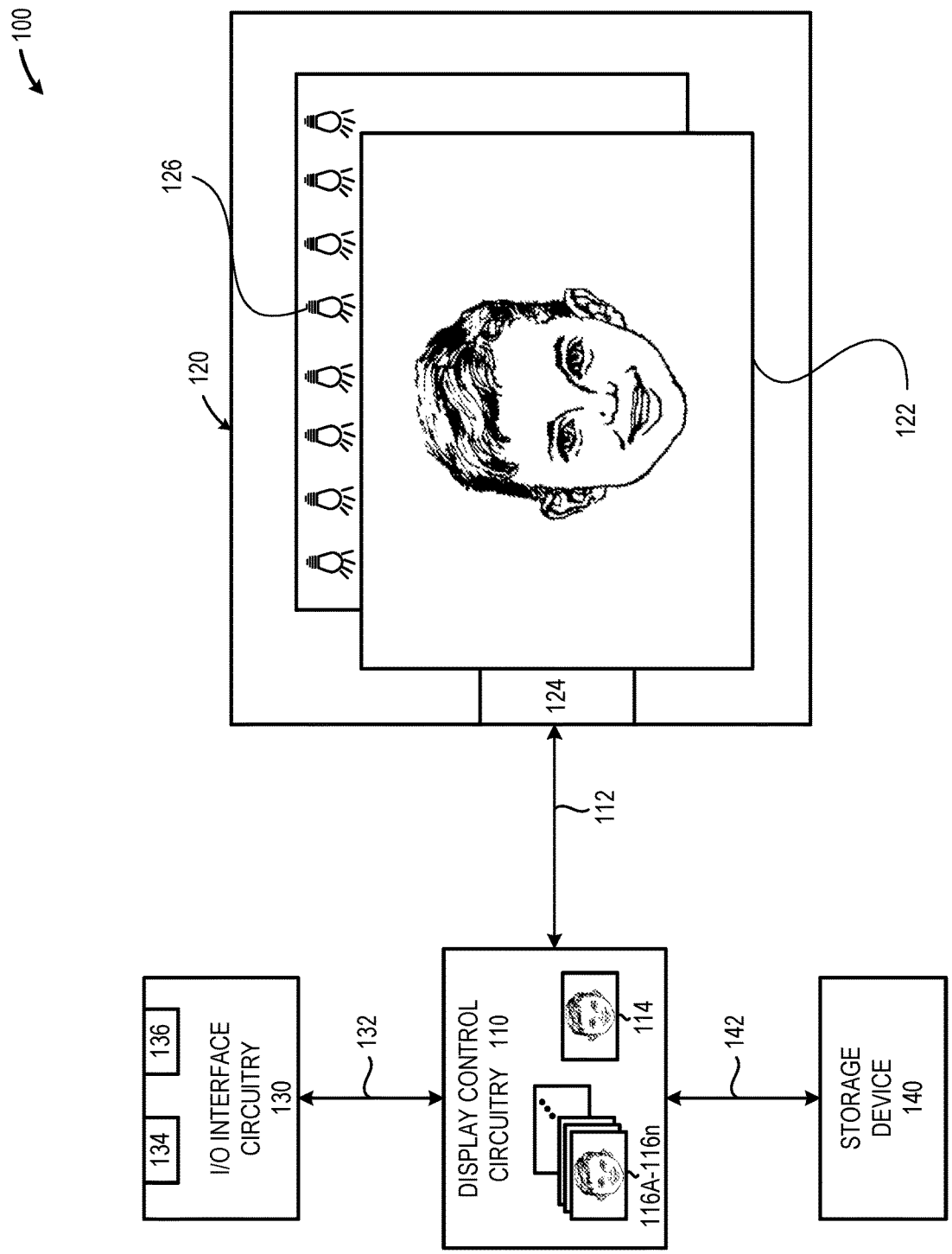
FIG. 1 depicts a block diagram of an illustrative system that includes display control circuitry coupled to a display device capable of operating at a plurality of power settings and in which the display control circuitry optimizes the image quality produced by the display device at each of the plurality of power settings, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Display Power Saving Technology (DPST) adaptively reduces backlight power consumption while maintaining satisfactory perceptive quality. DPST includes five power saving levels, each of which balances image quality against power savings. Each power saving level determines a percentage of pixels in the display that will have brightness reduced or distorted and the degree of distortion. When viewed as a graphical plot of Original Pixel Values (x-coordinate) against Boosted Pixel Values (y-coordinate) the percentage of pixels being distorted defines an inflection point with pixels above the inflection point being distorted based on the slope of the line segment portion ($K_1$) above the inflection point. The inflection point (which may vary from image to image) and the upper slope determine the degree of power savings. However, at times, even under the highest level of illumination, a significant loss of brightness occurs in some images. Thus, the use of a fixed power saving envelope fails to provide the best possible image quality.

The systems and methods disclosed herein beneficially and advantageously optimize image quality produced by a display device at each of a plurality of power settings. The pixels forming a display image are initially quantized based on the original 8-bit color value, forming a color distribution histogram. The systems and methods disclosed herein include a power level setting having associated therewith: a baseline first relationship between the original pixel value distribution and the boosted pixel value distribution (e.g., an upper line segment having a slope $K_1$); and a baseline allowable percentage of distorted original pixels ($X_i$) in the display image. The display power mode also defines a baseline second relationship between the original pixel value distribution and the boosted pixel value distribution (e.g., a lower line segment having a slope ($K_0$) where relatively higher $K_0$ values provide greater power savings and relatively lower $K_0$ values provide lesser power savings).

Display control circuitry determines a baseline peak signal to noise ratio (PSNR) for a baseline power setting (i.e., the baseline allowable percentage of distorted pixels and the baseline first relationship associated with the selected display power mode). The systems and methods disclosed herein select a plurality of test distorted pixel percentages and for each selected test percentage determine a corresponding test first relationship between the original pixel color value distribution and the boosted pixel color value distribution. For each selected test percentage, the display control circuitry determines a respective PSNR for the test percentage using the display image. The systems and methods disclosed herein then determine a value indicative of the change in image quality between the baseline allowable distorted original pixel percentage value and each of some or all of the test distorted original pixel percentage values. The systems and methods disclosed herein then select as the operating distorted original pixel percentage value the test distorted original pixel percentage value that demonstrates or otherwise provides the greatest improvement in image quality.

An image quality improvement system for display devices having multiple display power modes is provided. The system may include: a display device that includes a plurality of pixels to form a display image; display control circuitry coupled to the display device to: receive an input indicative of a display power mode selection; determine, for the display image at the selected baseline display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: select a test distorted original pixel percentage; determine a test mode relationship between the selected test distorted original pixel percentage, a number of test original pixel values and a number of test boosted pixel values; and determine, for the display image, a test PSNR associated with the selected test distorted original pixel value percentage to provide a plurality of test PSNRs; associate a quality loss value with the test distorted original pixel percentage, the quality loss value determined using a Mean Squared Error (MSE) and a histogram of the display image; and select an operating distorted original pixel percentage from the plurality of test distorted original pixel percentages using the determined quality loss value associated with each of the plurality of test distorted original pixel percentages.

A non-transitory storage device is provided. The non-transitory storage device includes instructions that, when executed by display control circuitry, cause the display control circuitry to: determine, for a display image at a selected display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: select a test distorted original pixel percentage; determine a test mode relationship between the selected test distorted original pixel percentage, a number of test original pixel values and a number of test boosted pixel values; and determine, for the display image, a test PSNR associated with the selected test distorted original pixel value percentage to provide a plurality of test PSNRs; associate a quality loss value with the test distorted original pixel percentage, the quality loss value determined using a Mean Squared Error (MSE) and a histogram of the display image; and select an operating distorted original pixel percentage from the plurality of test distorted original pixel percentages using the determined quality loss value associated with each of the plurality of test distorted original pixel percentages.

A system for optimizing the image quality of a display image on a display device having multiple display power settings is provided. The system may include: means for determining, for a display image at a selected display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: means for selecting a test distorted original pixel percentage; means for determining a test mode relationship between the selected test distorted original pixel percentage, a number of test original pixel values and a number of test boosted pixel values; and means for determining, for the display image, a test PSNR associated with the selected test distorted original pixel value percentage to provide a plurality of test PSNRs; means for associating a quality loss value with the test distorted original pixel percentage, the quality loss value determined using a Mean Squared Error (MSE) and a histogram of the display image; and means for selecting an operating distorted original pixel percentage from the plurality of test distorted original pixel percentages using the determined quality loss value associated with each of the plurality of test distorted original pixel percentages.

A method of optimizing the image quality of a display image on a display device having multiple display power settings is provided. The method may include: determining, for a display image at a selected display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: selecting a test distorted original pixel percentage; determining a test mode relationship between the selected test distorted original pixel percentage, a number of test original pixel values and a number of test boosted pixel values; and determining, for the display image, a test PSNR associated with the selected test distorted original pixel value percentage to provide a plurality of test PSNRs; associating a quality loss value with the test distorted original pixel percentage, the quality loss value determined using a Mean Squared Error (MSE) and a histogram of the display image; and selecting an operating distorted original pixel percentage from the plurality of test distorted original pixel percentages using the determined quality loss value associated with each of the plurality of test distorted original pixel percentages.

An electronic device is provided. The electronic device includes: a printed circuit board; one or more processors coupled to the printed circuit board; a display device having a plurality of pixels; and display control circuitry coupled to the printed circuit board. The display control circuitry to: receive an input indicative of a display power mode selection; determine, for the display image at the selected baseline display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: select a test distorted original pixel percentage; determine a test mode relationship between the selected test distorted original pixel percentage, a number of test original pixel values and a number of test boosted pixel values; and determine, for the display image, a test PSNR associated with the selected test distorted original pixel value percentage to provide a plurality of test PSNRs; associate a quality loss value with the test distorted original pixel percentage, the quality loss value determined using a Mean Squared Error (MSE) and a histogram of the display image; and select an operating distorted original pixel percentage from the plurality of test distorted original pixel percentages using the determined quality loss value associated with each of the plurality of test distorted original pixel percentages.

As used herein, the term "on-chip" or elements, components, systems, circuitry, or devices referred to as "on-chip" include such items integrally fabricated with the processor circuitry (e.g., a central processing unit, or CPU, in which the "on-chip" components are included, integrally formed, and/or provided by CPU circuitry) or included as separate components formed as a portion of a multi-chip module (MCM) or system-on-chip (SoC).

As used herein the terms "about" or "approximately" when used to prefix an enumerated value should be interpreted to indicate a value that is plus or minus 15% of the enumerated value. Thus, a value that is listed as "about 100" or "approximately 100%" should be understood to represent a value that could include any value or group of values between 85 (i.e., −15%) to 115 (i.e., +15%).

FIG. 1 depicts a block diagram of an illustrative system 100 that includes display control circuitry 110 coupled to a display device 120 capable of operating at a plurality of power settings and in which the display control circuitry 110 optimizes the image quality produced by the display device 120 at each of the plurality of power settings, in accordance with at least one embodiment described herein. As depicted in FIG. 1, the display control circuitry 110 receives input/output via I/O interface circuitry 130 and receives machine-readable instruction sets from the storage device 140.

The display device 120 may operate at any one of a plurality of display power modes. Each of the plurality of display power modes includes a respective baseline first relationship between the original pixel value distribution and the boosted pixel value distribution (e.g., an upper line segment having a fixed slope ($K_1$) where relatively higher $K_1$ values provide greater power savings and relatively lower $K_1$ values provide lesser power savings); and a respective baseline percentage of allowable distorted original pixels ($X_i$) within a display image 122. The data associated with each of the plurality of display power modes may be stored in the storage device 140 and/or in one or more storage devices disposed at least partially within the display control circuitry 110.

In operation, the display control circuitry 110 receives information and/or data indicative of the selected display power mode 132 via the I/O interface circuitry 130. In embodiments, the information and/or data indicative of the selected display power mode 132 may be generated autonomously and communicated to the display control circuitry 110. For example, a processor or controller circuit may generate the information and/or data indicative of the selected display power mode 132 based on one or more environmental conditions (e.g., ambient light conditions) and/or one or more system conditions (e.g., power source/battery power level). In embodiments, the information and/or or data indicative of the selected display power mode may be provided manually. For example, a system user may manually select a desired display power mode. In response, the display control circuitry 110 retrieves the information and/or data indicative of the first relationship between the original pixel color value distribution and the boosted pixel color value distribution and the respective allowable distorted original value pixel percentage associated with the selected display power mode.

Using the retrieved information associated with the selected display power mode 132, in embodiments, the display control circuitry 110 first determines a baseline PSNR 114 for the display image 122 provided by the display device 120 at the selected display power mode 132. The display control circuitry 110 retrieves the baseline first relationship ($K_1$) associated with the selected display power mode 132. The baseline first relationship ($K_1$) relates the 8-bit original pixel color value distribution to the 8-bit boosted pixel color value distribution for each display image 122 provided by the display device 120. The relationship between the original pixel color value distribution to the boosted pixel color value distribution may change for each display image 122 provided by the display device 120. Using the baseline first relationship ($K_1$) between the original pixel color value distribution and the baseline boosted pixel color value distribution of the display image 122 and the baseline allowable distorted original value pixel percentage ($X_i$) associated with the selected display power mode 132, the display control circuitry 110 determines the baseline PSNR 114. The display control circuitry 110 then determines a baseline second relationship ($K_0$) between the original pixel color value distribution and the boosted pixel color value distribution of the display image 122. In embodiments, the display control circuitry 110 may determine the second relationship. In embodiments, the display control circuitry determines the baseline second relationship (K0) using the following formula:

$$K_0 = (255 - K_1*(255-X_i))/X_i \quad (1)$$

The display control circuitry 110 then, for each of a plurality of test distorted original pixel percentages ($X_{i1}$–$X_{in}$) maintains the baseline second relationship ($K_0$) constant and, for each of the test distorted original pixel percentages, determines a respective test first relationship (i.e., $K_{11}$–$K_{1n}$) between the original pixel value distribution and the boosted pixel value distribution using the following formula $$K_{1j} = (255 - (X_{ij}*K_0))/(255-X_{ij}) \quad (2)$$

For each of the test distorted original pixel percentages ($X_{i1}$–$X_{in}$), the display control circuitry 110 determines a respective test PSNR 116A-116 n.

The display control circuitry 110 then determines a respective change in display image quality value for each of the test distorted original pixel percentages ($X_{i1}$–$X_{in}$). The change in display image quality provides an indication of the effect on image quality based on varying the of distorted original value pixel percentage in a given display image 122. In embodiments, the display control circuitry 110 determines the change in display image quality using a histogram and/or the mean squared error (MSE) between each respective one of the plurality of test PSNRs 116A-116 n and the baseline PSNR 114. The display control circuitry 110 then selects, as the operating distorted original value pixel percentage, the test distorted original value pixel percentage ($X_{ij}$) demonstrating the greatest improvement in display image quality over the baseline image. Beneficially, since the display control circuitry 110 uses the baseline second relationship ($K_0$) to determine each of the change in display image quality values, the power consumption of each of the test allowable distorted pixel percentages ($X_{ij}$) and test first relationship combinations ($K_{1j}$) is similar or identical. Thus, the display control circuitry 110 advantageously improves the quality of the display image 122 while not increasing the power consumption of the display device 120.

The display control circuitry 110 includes any number and/or combination of currently available and/or future developed electronic components, semiconductor devices, and/or logic elements capable of executing one or more machine executable instruction sets. In embodiments, the display control circuitry 110 may include one or more non-volatile data storage or memory circuits capable of storing the information and/or data indicative of the respective baseline first relationship ($K_1$) between the original pixel value distribution and the baseline boosted pixel value distribution of the display image 122 and the respective baseline allowable distorted original value pixel percentage ($X_i$) associated with each of the plurality of display power modes 132A-132 $n$. The display control circuitry 110 executes one or more machine-readable instruction sets that cause the display control circuitry 110 to determine a respective value indicative of change in image quality over a baseline image quality value for each of a plurality test allowable distorted original pixel value percentages ($X_{i1}$-$X_{in}$). The machine-readable instructions further cause the display control circuitry 110 to select an operating distorted original pixel value percentage from the plurality of test allowable distorted original pixel value percentage display operating condition based, at least in part, on the test PSNR 116 that provides the greatest improvement in PSNR 116 over the baseline PSNR 114. The display control circuitry 110 then causes the display device 120 to operate at the conditions associated with the selected test PSNR 116.

The display control circuitry 110 may be disposed in whole or in part within a processor-based device such as a smartphone, portable processor-based device, laptop computer, tablet computer, wearable computer, or similar. The display control circuitry 110 may be disposed in whole or in part within the display device 120. The display control circuitry 110 may be disposed in whole or in part within a graphical processing unit (GPU) or similar vector processing circuitry. In embodiments, the display control circuitry 110 may include a stand-alone semiconductor device such as an Application Specific Integrated Circuit (ASIC) or field programmable gate array (FPGA) arranged as a System-on-Chip (SoC) or multi-chip module (MCM).

The display device 120 may include any number and/or combination of electronic components, semiconductor devices, and/or logic elements capable of providing a human perceptible, visual, output. In embodiments, the display device 120 may include one or more touchscreen devices that provide a tactile input as well as a video or visual output. In embodiments, the display device 120 includes one or more I/O interface circuits 124 and/or one or more backlight circuits 126 capable of generating an electromagnetic output corresponding and/or proportional to one of a plurality of display power modes 132A-132 $n$. The display device 120 may be disposed in a smartphone, portable computer, wearable computer, tablet computer, laptop computer or netbook. The display device 120 may use any currently available or future developed display technology, such as liquid crystal display (LCD) display technology; light emitting diode (LED) display technology; quantum dot LED (QLED) display technology; polymer LED (PLED) display technology; and similar. The display device 120 may have any display resolution, including but not limited to: 4:3 aspect ratio resolutions (640×480, 800×600, 960×720, 1024×768, 1280× 960, 1400×1050, 1440×1080, 1600×1200, 1856×1392, 1920×1440, 2048×1536, etc.); 16:10 aspect ratio resolutions (1200×800, 1440×900, 1680×1050, 1920×1200, 2560× 1600, etc.); or any other aspect ratios and/or display resolutions. In embodiments, the display device 120 includes one or more I/O interfaces to receive information and/or data indicative of the display operating mode 112 from the display control circuitry 110.

The I/O interface circuitry 130 includes any number and/or combination of wired I/O interface circuits 134 and/or wireless I/O interface circuits 136. The I/O interface circuitry 130 communicates information and/or data indicative of a defined display power mode 132 to the display control circuitry 110. In embodiments, the display power mode 132 may be autonomously selected. For example, by a system control circuit coupled to one or more sensors and/or sensor arrays, such as an ambient light sensor or sensor array that provides an input used to adjust the brightness of the display device 120. In embodiments, the display power mode 132 may be manually selected. For example, a system user may provide an input indicative of a desired display power mode 132.

The storage device 140 may include any number and/or combination of devices capable of storing information and/or data including one or more machine-readable instruction sets. In embodiments, the storage device 140 may include one or more data stores, data structures, or databases, that store or otherwise retain information and/or data representative of: the first relationship ($K_1$) between the baseline original pixel color value distribution and the baseline boosted pixel color value distribution associated with each respective one of the plurality of display power modes 132A-132 $n$; and the baseline allowable limit of distorted original color value pixels ($X_i$) associated with the selected display power mode 132.

Figure 2A:
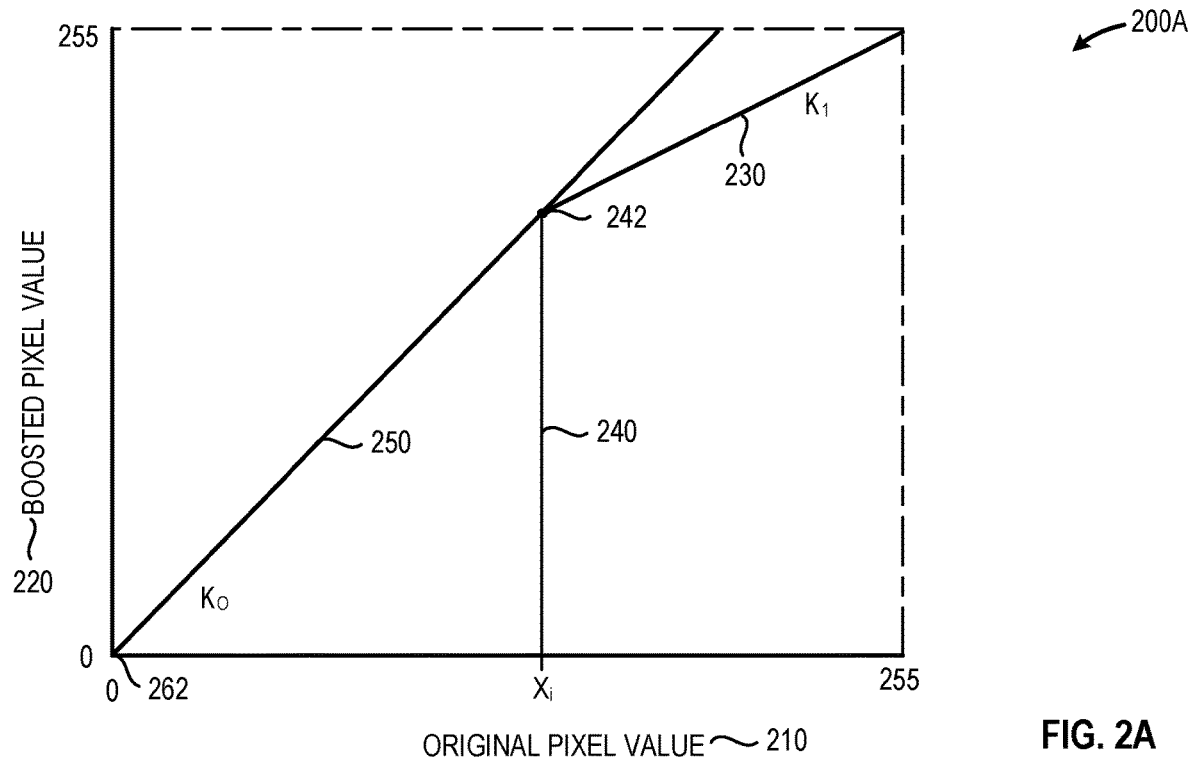
FIG. 2A is a chart of original pixel values against boosted pixel values that depicts an illustrative graphical determination of a baseline second relationship ($K_0$) at the intersection of the baseline first relationship ($K_1$) and the baseline allowable percentage of distorted original pixel values ($X_i$) associated with a selected display power mode, in accordance with at least one embodiment described herein.
Figure 2B:
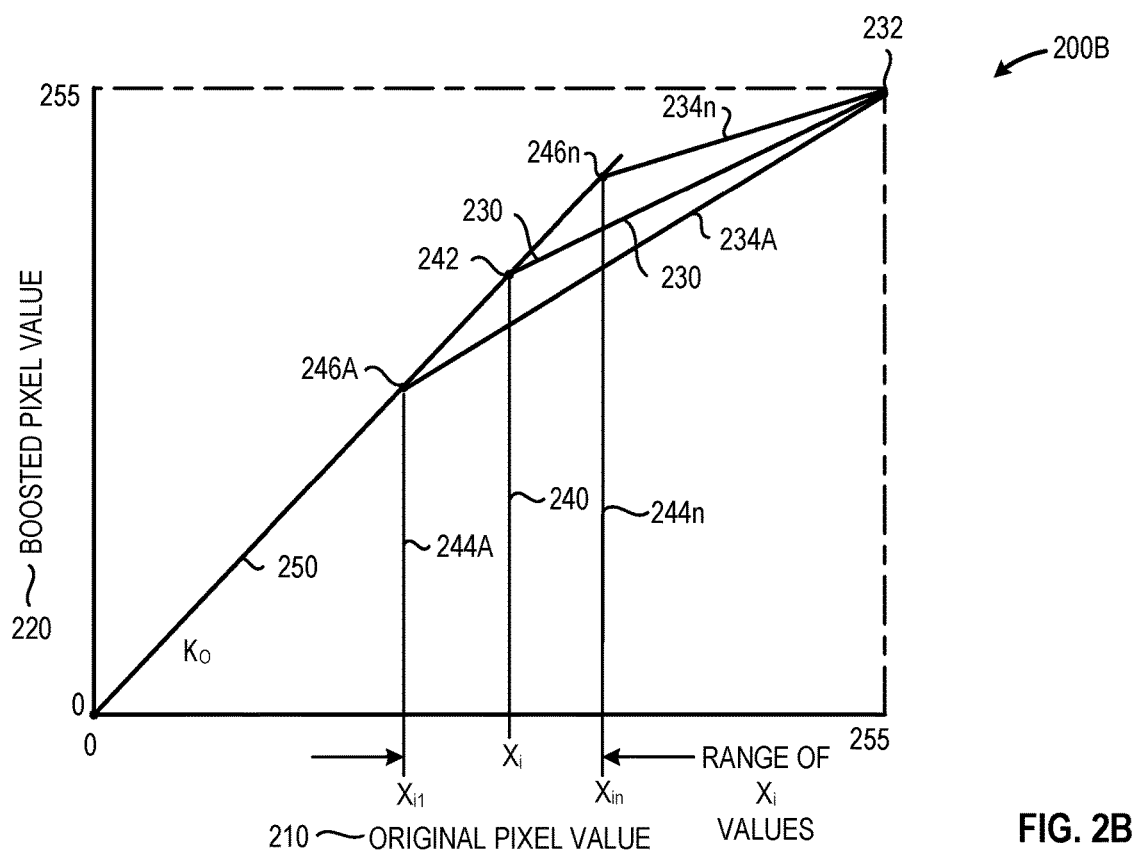
FIG. 2B is a chart of original pixel values against boosted pixel values that depicts an illustrative graphical determination of a plurality of first test relationships ($K_{11}$-$K_{1n}$), each corresponding to a respective one of a plurality of test distorted original pixel values ($X_{i1}$-$X_{in}$), in accordance with at least one embodiment described herein.

FIG. 2A is a chart 200A of original pixel values 210 against boosted pixel values 220 that depicts an illustrative graphical determination of a baseline second relationship ($K_O$) 250 at the intersection of the baseline first relationship ($K_1$) 230 and the baseline allowable percentage of distorted original pixel values ($X_i$) 240 associated with a selected display power mode 132, in accordance with at least one embodiment described herein. FIG. 2B is a chart 200B of original pixel values 210 against boosted pixel values 220 that depicts an illustrative graphical determination of a plurality of first test relationships ($K_{11}$-$K_{1n}$), each corresponding to a respective one of a plurality of test distorted original pixel values ($X_{i1}$-$X_{in}$), in accordance with at least one embodiment described herein.

Turning first to FIG. 2A, the original pixel value 210 includes 256 values (from 0 to 255). The original pixel values may be quantized into a plurality of "bins"—each bin containing an equal or unequal number of original pixel values. For example, the original pixel values 210 may be quantized into 32 bins, each containing 8 original pixel values. Similarly, the boosted pixel values 220 include 256 values (from 0 to 255). The boosted pixel values 220 may be quantized into a plurality of "bins"—each bin containing an equal or unequal number of boosted pixel values 220. For example, the boosted pixel values 220 may be quantized into 32 bins, each containing 8 original pixel values.

Each of the plurality of display power modes 132A-132 $n$ includes a corresponding first relationship ($K_1$) 230 that relates the original pixel values 210 to the boosted pixel values 220. Generally, as the slope of the baseline first relationship ($K_1$) 230 approaches zero, the distortion in the distorted pixels increases, and as the slope of the baseline first relationship ($K_1$) 230 approaches one, the distortion in the distorted pixels decreases. As depicted in FIG. 2A, the baseline second relationship ($K_O$) 250 extends from the origin 252 to the intersection 242 of the baseline allowable percentage of distorted original pixels (X$_i$) 240 and the baseline first relationship (K$_1$) 230. The baseline first relationship (K$_1$) 230 extends from the intersection 242 of the baseline allowable percentage of distorted original pixel values (X$_i$) 240 and the baseline first relationship (K$_1$) 230 to a terminal corner point 232 of the chart 200A. The baseline second relationship (K$_0$) 250 remains a fixed at a given display power mode 132—the display power remains constant for the extent of the second relationship. In embodiments, the baseline second relationship (K$_0$) 250 is determined as:

$$K_0=(255-K_1*(255-X_i))/X_i \qquad (3)$$

The display control circuitry 110 determines a baseline peak signal-to-noise ratio (PSNR) 114 using the information obtained from the baseline first relationship 230 and the baseline allowable percentage of distorted original pixel values (X$_i$) 240.

Turning next to FIG. 2B, for each of a plurality of test distorted original pixel values (X$_{i1}$-X$_{in}$) 244A-244 n (collectively, "test distorted original pixel values 244") a corresponding plurality of first test relationships (K$_{11}$-K$_{1n}$) 234A-234 n extend from the intersection points 246A-246 n of each test distorted original pixel value 244 with the baseline second relationship 250 to the terminal corner point 232 of the chart 200B. Each of the plurality of first test relationships (K$_{11}$-K$_{1n}$) 234A-234 n may be given by:

$$K_{1j}=(255-(X_{ij}*K_0))/(255-X_{ij}) \qquad (4)$$

For each combination of test distorted original pixel value (X$_{i1}$-X$_{in}$) 244A-244 n and each of the plurality of test first relationships (K$_{11}$-K$_{1n}$) 234A-234 n, the display control circuitry 110 determines a quality loss by distortion based on Mean Squared Error (MSE) and histogram. The display control circuitry 110 then selects the test distorted original pixel value 244 and test first relationship 234 that provides the most improved image based on the MSE and histogram. The selected test distorted original pixel value 244 and test first relationship 234 beneficially shares the same power savings as the baseline original pixel value and baseline first relationship, but advantageously improves image quality by adjusting the distortion of the display image 122 based on the histogram of the display image 122.

Figure 3:
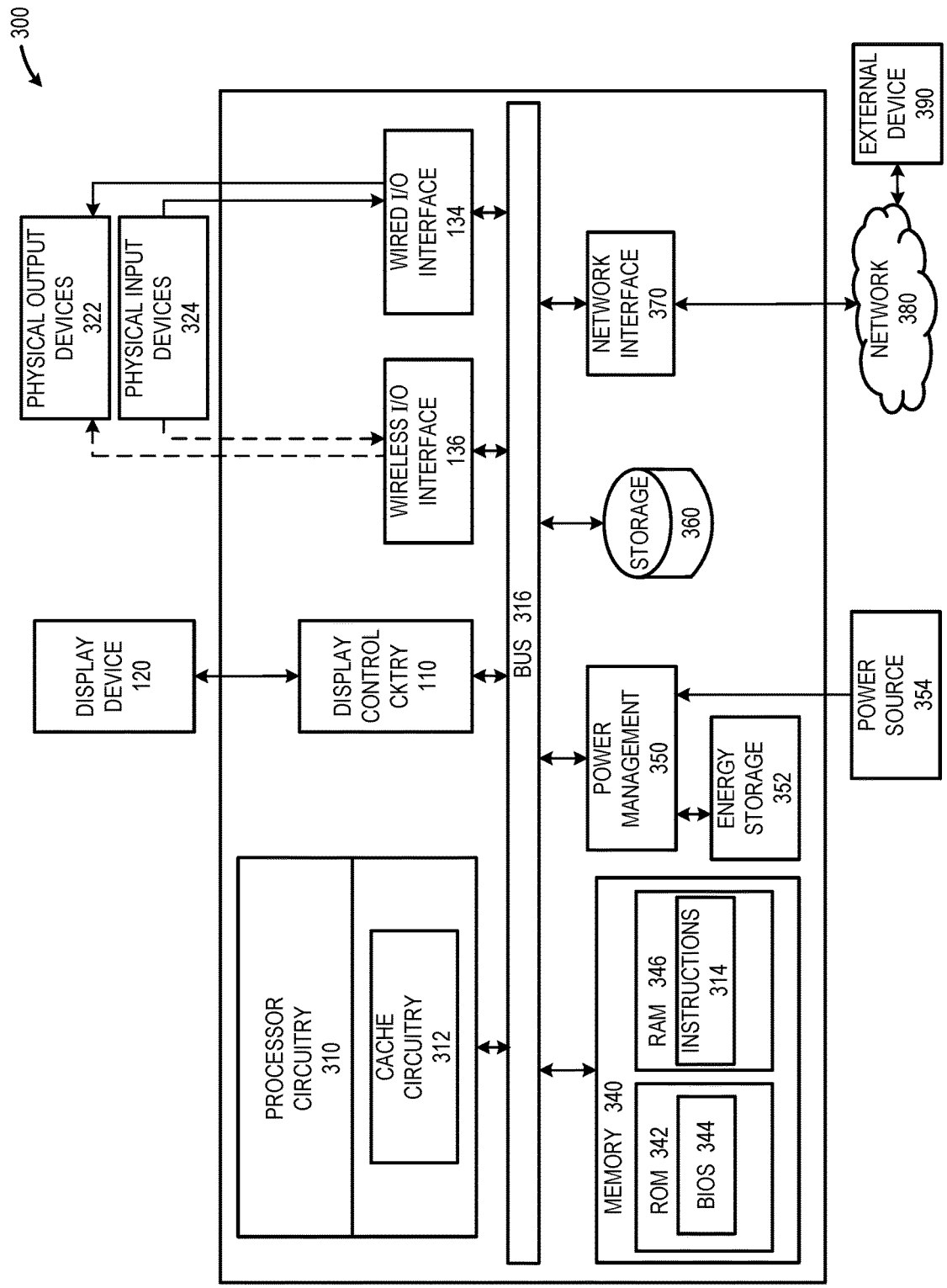
FIG. 3 is a schematic diagram of an illustrative electronic, processor-based, device that includes display control circuitry to optimize image quality produced by a communicatively coupled display device 120 at each of a plurality of display power modes, in accordance with at least one embodiment described herein.

FIG. 3 is a schematic diagram of an illustrative electronic, processor-based, device 300 that includes display control circuitry 110 to optimize image quality produced by a communicatively coupled display device 120 at each of a plurality of display power modes 132A-132 n, in accordance with at least one embodiment described herein. The processor-based device 300 may additionally include one or more of the following: processor circuitry 310, processor cache circuitry 312, system memory 340, power management circuitry 350, a non-transitory storage device 360, and a network interface 370. The following discussion provides a brief, general description of the components forming the illustrative processor-based device 300. Example, non-limiting processor-based devices 300 may include, but are not limited to: smartphones, wearable computers, portable computing devices, handheld computing devices, desktop computing devices, servers, blade server devices, workstations, and similar.

In some embodiments, the processor-based device 300 includes graphics processor circuitry 312 capable of executing machine-readable instruction sets and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 300 includes a bus or similar communications link 316 that communicably couples and facilitates the exchange of information and/or data between various system components including the processor circuitry 310, the display control circuitry 110, one or more wired I/O interfaces 134, one or more wireless I/O interfaces 136, the system memory 170, one or more storage devices 360, and/or one or more network interfaces 370. The processor-based device 300 may be referred to in the singular herein, but this is not intended to limit the embodiments to a single processor-based device 300, since in certain embodiments, there may be more than one processor-based device 300 that incorporates, includes, or contains any number of communicably coupled, collocated, or remote networked circuits or devices.

The processor circuitry 310 may include any number, type, or combination of currently available or future developed devices capable of executing machine-readable instruction sets. The processor circuitry 310 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 3 are of conventional design. Consequently, such blocks need not be described in further detail herein, as they will be understood by those skilled in the relevant art. The bus 316 that interconnects at least some of the components of the processor-based device 300 may employ any currently available or future developed serial or parallel bus structures or architectures.

The system memory 340 may include read-only memory ("ROM") 342 and random access memory ("RAM") 346. A portion of the ROM 342 may be used to store or otherwise retain a basic input/output system ("BIOS") 344. The BIOS 344 provides basic functionality to the processor-based device 300, for example by causing the processor circuitry 310 to load and/or execute one or more machine-readable instruction sets 314. In embodiments, at least some of the one or more machine-readable instruction sets cause at least a portion of the processor circuitry 310 to provide, create, produce, transition, and/or function as a dedicated, specific, and particular machine, for example a word processing machine, a digital image acquisition machine, a media playing machine, a gaming system, a communications device, a smartphone, an autonomous vehicle control system, or similar.

The processor-based device 300 may include at least one wireless input/output (I/O) interface 136. The at least one wireless I/O interface 136 may be communicably coupled to one or more physical output devices 322 (tactile devices, video displays, audio output devices, hardcopy output devices, etc.). The at least one wireless I/O interface 136 may communicably couple to one or more physical input devices 324 (pointing devices, touchscreens, keyboards, tactile devices, etc.). The at least one wireless I/O interface 136 may include any currently available or future developed wireless I/O interface. Example wireless I/O interfaces 136 include, but are not limited to: BLUETOOTH®, near field communication (NFC), and similar.

The processor-based device 300 may include one or more wired input/output (I/O) interfaces 134. The at least one wired I/O interface 134 may be communicably coupled to one or more physical output devices 322 (tactile devices, video displays, audio output devices, hardcopy output devices, etc.). The at least one wired I/O interface 134 may be communicably coupled to one or more physical input devices 324 (pointing devices, touchscreens, keyboards, tactile devices, etc.). The wired I/O interface 134 may include any currently available or future developed I/O interface. Example wired I/O interfaces 134 include but are not limited to: universal serial bus (USB), IEEE 1394 ("FireWire"), and similar.

The processor-based device 300 may include one or more communicably coupled, non-transitory, data storage devices 360. The data storage devices 360 may include one or more hard disk drives (HDDs) and/or one or more solid-state storage devices (SSDs). The one or more data storage devices 360 may include any current or future developed storage appliances, network storage devices, and/or systems. Non-limiting examples of such data storage devices 360 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 360 may include one or more removable storage devices, such as one or more flash drives, flash memories, flash storage units, or similar appliances or devices capable of communicable coupling to and decoupling from the processor-based device 300.

The one or more data storage devices 360 may include interfaces or controllers (not shown) communicatively coupling the respective storage device or system to the bus 316. The one or more data storage devices 360 may store, retain, or otherwise contain machine-readable instruction sets, data structures, program modules, data stores, databases, logical structures, and/or other data useful to the processor circuitry 310 and/or one or more applications executed on or by the processor circuitry 310. In some instances, one or more data storage devices 360 may be communicably coupled to the processor circuitry 310, for example via the bus 316 or via one or more wired communications interfaces 134 (e.g., Universal Serial Bus or USB); one or more wireless communications interfaces 136 (e.g., Bluetooth®, Near Field Communication or NFC); and/or one or more network interfaces 370 (IEEE 802.3 or Ethernet, IEEE 802.11, or WiFi®, etc.).

The processor-based device 300 may include power management circuitry 350 that controls one or more operational aspects of the energy storage device 352. In embodiments, the energy storage device 352 may include one or more primary (i.e., non-rechargeable) or secondary (i.e., rechargeable) batteries or similar energy storage devices. In embodiments, the energy storage device 352 may include one or more supercapacitors or ultracapacitors. In embodiments, the power management circuitry 350 may alter, adjust, or control the flow of energy from an external power source 354 to the energy storage device 352 and/or to the processor-based device 300. The power source 354 may include, but is not limited to, a solar power system, a commercial electric grid, a portable generator, an external energy storage device, or any combination thereof.

For convenience, the processor circuitry 310, the storage device 360, the system memory 340, the wireless I/O interface 136, the wired I/O interface 134, the power management circuitry 350, and the network interface 370 are illustrated as communicatively coupled to each other via the bus 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In some embodiments, all or a portion of the bus 316 may be omitted and the components are coupled directly to each other using suitable wired or wireless connections.

Figure 4:
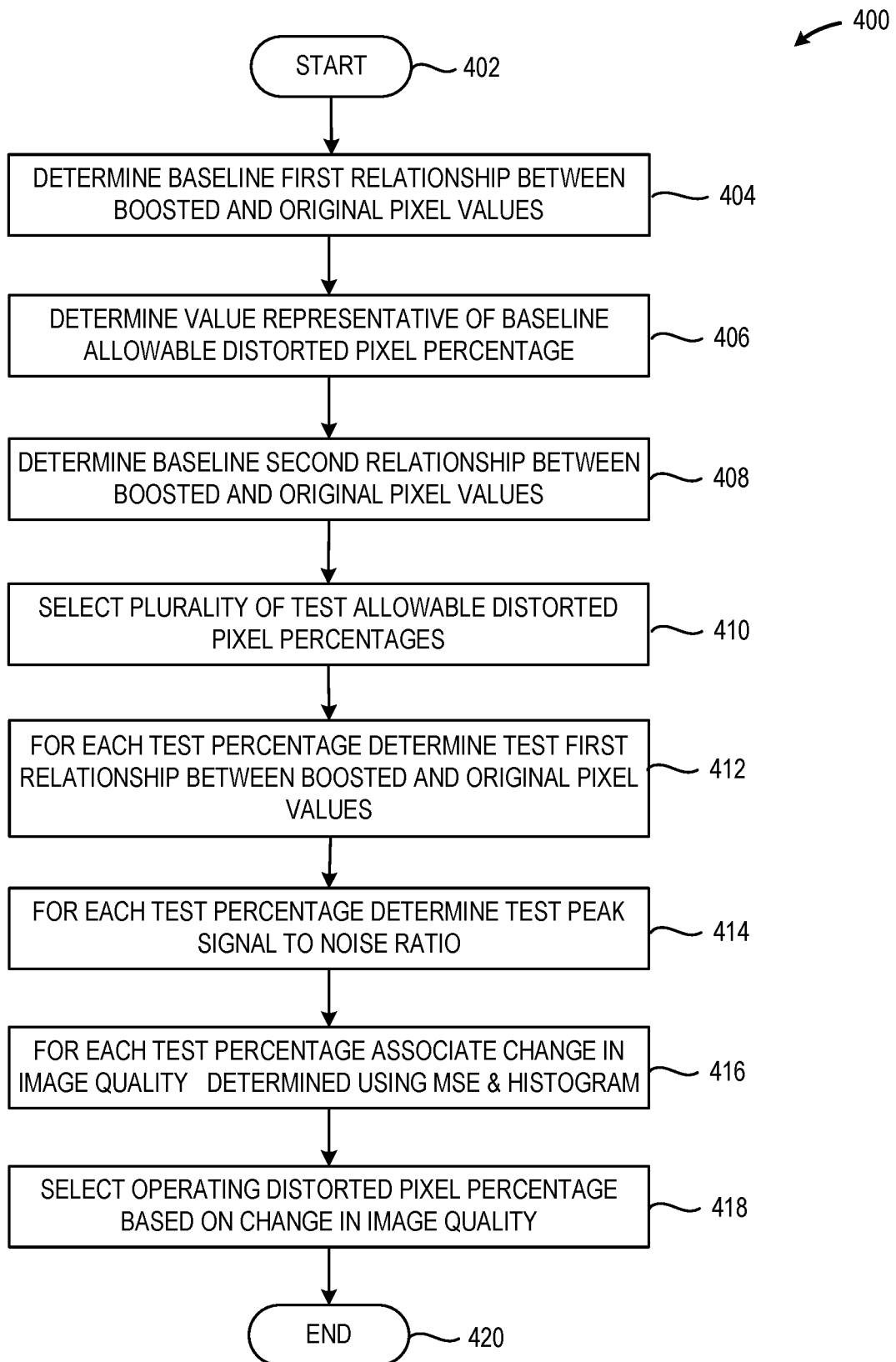
FIG. 4 is a high-level logic flow diagram of an illustrative method of optimizing the quality of a display image produced by a display device at each of a plurality of power settings, in accordance with at least one embodiment described herein.

FIG. 4 is a high-level logic flow diagram of an illustrative method 400 of optimizing the quality of a display image 122 produced by a display device 120 at each of a plurality of power settings 132A-132 $n$, in accordance with at least one embodiment described herein. In embodiments, a display device 120 operates in one of a plurality of display power modes 132A-132$n$. For example, a display device 120 may be manually or autonomously selectively placed in one of five (5) different display power modes 132A-132E, with each of the display power modes 132 presenting a different power draw/consumption on the system. A respective baseline first relationship ($K_1$) 230 and a respective baseline allowable percentage of distorted original pixels ($X_i$) 240 are associated with each of the plurality of display power modes 132A-132$n$. The baseline first relationship ($K_1$) 230 and the baseline allowable percentage of distorted original pixels ($X_i$) 240 associated with a respective display power mode 132 defines a baseline second relationship ($K_0$). In embodiments, the baseline first relationship ($K_1$) 230, the baseline allowable percentage of distorted original pixels ($X_i$) 240, and the baseline second relationship ($K_0$) may be used to determine a peak signal-to-noise ratio (PSNR) for a display image 122 on the display device 120. Note that because the baseline allowable percentage of distorted original pixels ($X_i$) 240 is expressed as a percentage, the actual original pixel value 210 associated with the baseline allowable percentage of distorted original pixels ($X_i$) 240 will vary based on the color and/or tonal content of the display image. The method 400 commences at 402.

At 404, after receipt of an input containing information of a manually or autonomously selected display power mode 132, the display control circuitry 110 selects and/or determines the baseline first relationship ($K_1$) 230 associated with the selected display power mode 132. The baseline first relationship ($K_1$) 230 defines a first relationship between the original pixel values 210 and the boosted pixel values 220. In embodiments, the display control circuitry 110 may retrieve data representative of the baseline first relationship ($K_1$) 230 from system memory 340 and/or one or more storage devices 140.

At 406, the display control circuitry 110 selects and/or determines the baseline allowable percentage of distorted original pixels ($X_i$) 240 associated with the selected display power mode 132. The baseline allowable percentage of distorted original pixels ($X_i$) 240. In embodiments, the display control circuitry 110 may retrieve data representative of the baseline allowable percentage of distorted original pixels ($X_i$) 240 from system memory 340 and/or one or more storage devices 140.

At 408, the display control circuitry 110 determines a baseline second relationship ($K_0$) 250 between the original pixel values 210 and the boosted pixel values 220. In embodiments, the baseline second relationship ($K_0$) 250 may be determined as a function of the baseline first relationship ($K_1$) 230 and the baseline allowable percentage of distorted original pixels ($X_i$) 240 using the formula:

$$K_0 = (255 - K_1 * (255 - X_i))/X_i \quad (5)$$

At 410, the display control circuitry 110 determines and/or selects a plurality of test distorted original pixel percentages ($X_{i1}$-$X_{in}$) 244A-244n. In embodiments, the range of test distorted original pixel percentages ($X_{i1}$-$X_{in}$) 244A-244n may extend above and/or below the baseline allowable percentage of distorted original pixels ($X_i$) 240. In embodiments, for an 8-bit pixel value, the range of test distorted original pixel percentages ($X_{i1}$-$X_{in}$) 244A-244n may have a maximum value given by the formula:

$$X_{in} = 255/K_0 \quad (6)$$

At 412, the display control circuitry 110 determines a respective test first relationship ($K_{11}$-$K_{1n}$) 234A-234n for each of the test distorted original pixel percentages ($X_{i1}$-$X_{in}$) 244A-244n selected at 410. In embodiments, each of test first relationships ($K_{11}$-$K_{1n}$) 234A-234n may be determined as a function of the baseline second relationship ($K_0$) 250 determined at 408 and the respective test distorted original pixel percentage ($X_{ij}$) 244 using the formula:

$$K_{1j} = (255 - (X_{ij} * K_0))/(255 - X_{ij}) \quad (7)$$

Note that, since each of the test first relationships ($K_{11}$-$K_{1n}$) 234A-234n intersect the baseline second relationship ($K_0$) 250, ALL of the test distorted original pixel percentages ($X_{i1}$-$X_{in}$) 244A-244n will beneficially result in the same power consumption as the originally selected baseline display power mode 132.

At 414, the display control circuitry 110 determines a respective test PSNR 116A-116n for each of the test first relationships ($K_{11}$-$K_{1n}$) 234A-234n.

At 416, the display control circuitry 110 determines a respective value indicative of the change in image quality for each of the plurality of test distorted original pixel percentages ($X_{i1}$-$X_{in}$) 244A-244n. In embodiments, the display control circuitry determines the value indicative if the change in image quality based using a Mean Squared Error (MSE) analysis along with a histogram of the display image 122 on the display device 120.

At 418, the display control circuitry 110 selects an operating distorted original pixel percentage that provides the best image quality improvement over the baseline allowable percentage of distorted original pixels ($X_i$) 240 as measured by the analysis performed at 416. In embodiments, the display control circuitry 110 communicates information and/or data indicative of the desired operating original pixel percentage as a signal 112 to the display device 120. The method 400 concludes at 420.

While FIG. 4 illustrates various operations according to one or more embodiments, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the terms "circuit" and "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of optimizing display image quality on display devices having a plurality of display power modes. Each power mode has associated therewith a respective baseline allowable percentage of distorted pixels and a baseline first relationship between an original pixel value and boosted pixel value. Display control circuitry determines a baseline second relationship using the baseline percentage of distorted pixels and the baseline first relationship. The display control circuitry selects a plurality of test distorted original pixel values and determines a respective test first relationship. Using the test distorted original pixel value, the respective test first relationship, and the baseline second relationship, the display control circuitry determines a respective PSNR and value indicative of the change in display image quality for each of the test distorted original pixel values.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for optimizing display image quality on display devices having a plurality of display power modes.

According to example 1, there is provided an image quality improvement system for display devices having multiple display power modes. The system may include: a display device that includes a plurality of pixels to form a display image; display control circuitry coupled to the display device to: receive an input indicative of a display power mode selection; determine, for the display image at the selected baseline display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: select a test distorted original pixel percentage; determine a test mode relationship between the selected test distorted original pixel percentage, a number of test original pixel values and a number of test boosted pixel values; and determine, for the display image, a test PSNR associated with the selected test distorted original pixel value percentage to provide a plurality of test PSNRs; associate a quality loss value with the test distorted original pixel percentage, the quality loss value determined using a Mean Squared Error (MSE) and a histogram of the display image; and select an operating distorted original pixel percentage from the plurality of test distorted original pixel percentages using the determined quality loss value associated with each of the plurality of test distorted original pixel percentages.

Example 2 may include elements of example 1, and the display control circuitry may further cause the display device that includes the plurality of pixels to operate at the selected operating distorted original pixel value percentage.

Example 3 may include elements of examples 1 or 2 where the baseline power mode relationship between a number of original pixels and a number of boosted pixels used to form a display image may include: a first line segment portion having a slope $K_1$ associated with the baseline power mode relationship between the baseline original pixel values and the baseline boosted pixel values; and a second line segment portion based on the number of baseline original pixel values and the number of baseline boosted pixel values and having a slope K0 given by the formula:

$$K_0 = (255 - K_1 *(255 - X_i))/X_i.$$

Example 4 may include elements of any of examples 1 through 3 where the test mode relationship comprises a linear relationship in which at least one original pixel value and at least one boosted pixel value are shared between the test mode relationship and the first linear portion.

Example 5 may include elements of any of examples 1 through 4 where the baseline power mode relationship comprises a relationship in which at least one original pixel value and at least one boosted pixel value are shared between the first linear portion and the second linear portion.

Example 6 may include elements of any of examples 1 through 5 where the shared at least one original pixel value comprises a pixel value selected based using the allowable percentage of distorted original pixel values.

Example 7 may include elements of any of examples 1 through 6 where the test mode relationship between the respective test distorted original pixel percentage, the number of test original pixel values and the number of test boosted pixel values may include: a first line segment portion based on the number of test original pixel values and the number of test boosted pixel values and having a slope $K_{1n}$ given by the formula:

$$K_{1n} = (255 - (X_{in} * K_0))/(255 - X_{in}); \text{ and}$$

the second line segment portion having the slope $K_0$ based on the baseline number of original pixel values and the baseline number of boosted pixel values.

Example 8 may include elements of any of examples 1 through 7 where the upper distorted original pixel boundary limit is a value less than $255/K_0$.

Example 9 may include elements of any of examples 1 through 8 where the test mode relationship comprises a linear relationship in which at least one original pixel value and at least one boosted pixel value are shared between the test mode relationship and the baseline power mode relationship.

According to example 10, there is provided a non-transitory storage device. The non-transitory storage device includes instructions that, when executed by display control circuitry, cause the display control circuitry to: determine, for a display image at a selected display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: select a test distorted original pixel percentage; determine a test mode relationship between the selected test distorted original pixel percentage, a number of test original pixel values and a number of test boosted pixel values; and determine, for the display image, a test PSNR associated with the selected test distorted original pixel value percentage to provide a plurality of test PSNRs; associate a quality loss value with the test distorted original pixel percentage, the quality loss value determined using a Mean Squared Error (MSE) and a histogram of the display image; and select an operating distorted original pixel percentage from the plurality of test distorted original pixel percentages using the determined quality loss value associated with each of the plurality of test distorted original pixel percentages.

Example 11 may include elements of example 10 where the instructions further cause the display control circuitry to: cause a coupled display device to operate at the selected operating distorted original pixel percentage.

Example 12 may include elements of any of examples 10 or 11 where the instructions that cause the display control circuitry to determine the baseline power mode relationship may further cause the display control circuitry to: determining a baseline power mode relationship that includes: a first line segment portion having a slope $K_1$ associated with the baseline power mode relationship between the baseline original pixel values and the baseline boosted pixel values; and a second line segment portion based on the number of baseline original pixel values and the number of baseline boosted pixel values and having a slope $K_0$ given by the formula:

$$K_0 = (255 - K_1*(255-X_i))/X_i.$$

Example 13 may include elements of any of examples 10 through 12 where the instructions that cause the display control circuitry to determine the test mode relationship between the selected test distorted original pixel percentage, the number of test original pixel values and the number of test boosted pixel values further causes the display control circuitry to: determine a test mode relationship that includes a linear relationship in which at least one original pixel value and at least one boosted pixel value are shared between the test mode relationship and the first line segment portion of the baseline power mode relationship.

Example 14 may include elements of any of examples 10 through 13 where the instructions that cause the display control circuitry to determine the baseline power mode relationship further cause the display control circuitry to: determine a baseline power mode relationship in which at least one baseline original pixel value and at least one baseline boosted pixel value are common to both the first line segment portion and the second line segment portion.

Example 15 may include elements of any of examples 10 through 14 where the instructions that cause the display control circuitry to determine the baseline power mode relationship in which the at least one baseline original pixel value and the at least one baseline boosted pixel value are common to both the first line segment portion and the second line segment portion further cause the display control circuitry to: determine the baseline power mode relationship in which the at least one baseline original pixel value and the at least one baseline boosted pixel value are selected based on the value representative of the allowable percentage of distorted original pixel values ($X_i$) associated with the selected display power mode.

Example 16 may include elements of any of examples 10 through 15 where the instructions that cause the display control circuitry to determine the test mode relationship further cause the display control circuitry to: determine a test mode relationship that includes: a first line segment portion based on the number of test original pixel values and the number of test boosted pixel values and having a slope $K_{1n}$ given by the formula:

$$K_{1n} = (255 - (X_{in}*K_0))/(255-X_{in});\text{ and}$$

the second line segment portion having the slope $K_0$ based on the baseline number of original pixel values and the baseline number of boosted pixel values.

Example 17 may include elements of any of examples 10 through 16 where the instructions that cause the display control circuitry to select the test distorted original pixel percentage for each of the plurality of test distorted original pixel percentages ($X_{in}$) between the upper distorted original pixel boundary limit and the lower distorted original pixel boundary limit further cause the display control circuitry to: select the test distorted original pixel percentage for each of the plurality of test distorted original pixel percentages ($X_{in}$) between an upper distorted original pixel boundary limit that includes a value less than $255/K_0$ and a lower distorted original pixel boundary limit.

According to example 18, there is provided a system for optimizing the image quality of a display image on a display device having multiple display power settings. The system may include: means for determining, for a display image at a selected display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: means for selecting a test distorted original pixel percentage; means for determining a test mode relationship between the selected test distorted original pixel percentage, a number of test original pixel values and a number of test boosted pixel values; and means for determining, for the display image, a test PSNR associated with the selected test distorted original pixel value percentage to provide a plurality of test PSNRs; means for associating a quality loss value with the test distorted original pixel percentage, the quality loss value determined using a Mean Squared Error (MSE) and a histogram of the display image; and means for selecting an operating distorted original pixel percentage from the plurality of test distorted original pixel percentages using the determined quality loss value associated with each of the plurality of test distorted original pixel percentages.

Example 19 may include elements of example 18, and the system may further include: means for causing a communicatively coupled display device to operate at the selected operating distorted original pixel percentage.

Example 20 may include elements of any of examples 18 or 19 where the means for causing the display control circuitry to determine the baseline power mode relationship may include: means for determining a baseline power mode relationship that includes: a first line segment portion having a slope $K_1$ associated with the baseline power mode relationship between the baseline original pixel values and the baseline boosted pixel values; and a second line segment portion based on the number of baseline original pixel values and the number of baseline boosted pixel values and having a slope $K_0$ given by the formula:

$$K_0 = (255 - K_1*(255-X_i))/X_i.$$

Example 21 may include elements of any of examples 18 through 20 where the means for determining the test mode relationship between the selected test distorted original pixel percentage, the number of test original pixel values and the number of test boosted pixel values may include: means for determining a test mode relationship that includes a linear relationship in which at least one original pixel value and at least one boosted pixel value are shared between the test mode relationship and the first line segment portion of the baseline power mode relationship.

Example 22 may include elements of any of examples 18 through 21 where the means for determining the baseline power mode relationship may include: means for determining a baseline power mode relationship in which at least one baseline original pixel value and at least one baseline boosted pixel value are common to both the first line segment portion and the second line segment portion.

Example 23 may include elements of any of examples 18 through 22 where the means for determining the baseline power mode relationship may further include: means for determining a baseline power mode relationship in which the at least one baseline original pixel value and the at least one baseline boosted pixel value are selected based on the value representative of the allowable percentage of distorted original pixel values ($X_i$) associated with the selected display power mode.

Example 24 may include elements of any of examples 18 through 23 where the means for determining the test mode relationship may further include: means for determining a test mode relationship that includes: a first line segment portion based on the number of test original pixel values and the number of test boosted pixel values and having a slope $K_{1n}$ given by the formula:

$$K_{1n}=(255-(X_{in}*K_0))/(255-X_{in}); \text{ and}$$

the second line segment portion having the slope K0 based on the baseline number of original pixel values and the baseline number of boosted pixel values.

Example 25 may include elements of any of examples 18 through 24 where the means for selecting the test distorted original pixel percentage for each of the plurality of test distorted original pixel percentages ($X_{in}$) may further include: means for selecting the test distorted original pixel percentage for each of the plurality of test distorted original pixel percentages ($X_{in}$) between an upper distorted original pixel boundary limit that includes a value less than $255/K_0$ and a lower distorted original pixel boundary limit.

According to example 26, there is provided a method of optimizing the image quality of a display image on a display device having multiple display power settings. The method may include: determining, for a display image at a selected display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: selecting a test distorted original pixel percentage; determining a test mode relationship between the selected test distorted original pixel percentage, a number of test original pixel values and a number of test boosted pixel values; and determining, for the display image, a test PSNR associated with the selected test distorted original pixel value percentage to provide a plurality of test PSNRs; associating a quality loss value with the test distorted original pixel percentage, the quality loss value determined using a Mean Squared Error (MSE) and a histogram of the display image; and selecting an operating distorted original pixel percentage from the plurality of test distorted original pixel percentages using the determined quality loss value associated with each of the plurality of test distorted original pixel percentages.

Example 27 may include elements of example 26, and the method may additionally include: causing a communicatively coupled display device to operate at the selected operating distorted original pixel percentage.

Example 28 may include elements of any of examples 26 or 27 where causing the display control circuitry to determine the baseline power mode relationship comprises:

determining a baseline power mode relationship that includes: a first line segment portion having a slope $K_1$ associated with the baseline power mode relationship between the baseline original pixel values and the baseline boosted pixel values; and a second line segment portion based on the number of baseline original pixel values and the number of baseline boosted pixel values and having a slope $K_0$ given by the formula:

$$K_0=(255-K_1*(255-X_i))/X_i.$$

Example 29 may include elements of any of examples 26 through 28 where determining the test mode relationship between the selected test distorted original pixel percentage, the number of test original pixel values and the number of test boosted pixel values may include: determining a test mode relationship that includes a linear relationship in which at least one original pixel value and at least one boosted pixel value are shared between the test mode relationship and the first line segment portion of the baseline power mode relationship.

Example 30 may include elements of any of examples 26 through 29 where determining the baseline power mode relationship may include: means for determining a baseline power mode relationship in which at least one baseline original pixel value and at least one baseline boosted pixel value are common to both the first line segment portion and the second line segment portion.

Example 31 may include elements of any of examples 26 through 30 where determining the baseline power mode relationship may further include: determining a baseline power mode relationship in which the at least one baseline original pixel value and the at least one baseline boosted pixel value are selected based on the value representative of the allowable percentage of distorted original pixel values ($X_i$) associated with the selected display power mode.

Example 32 may include elements of any of examples 26 through 31 where determining the test mode relationship may further include: determining a test mode relationship that includes: a first line segment portion based on the number of test original pixel values and the number of test boosted pixel values and having a slope $K_{1n}$ given by the formula:

$$K_{1n}=(255-(X_{in}*K0))/(255-X_{in}); \text{ and}$$

the second line segment portion having the slope K0 based on the baseline number of original pixel values and the baseline number of boosted pixel values.

Example 33 may include elements of any of examples 26 through 32 where selecting the test distorted original pixel percentage for each of the plurality of test distorted original pixel percentages ($X_{in}$) may further include: selecting the test distorted original pixel percentage for each of the plurality of test distorted original pixel percentages ($X_{in}$) between an upper distorted original pixel boundary limit that includes a value less than $255/K_0$ and a lower distorted original pixel boundary limit.

According to example 34, there is provided an electronic device. The electronic device includes: a printed circuit board; one or more processors coupled to the printed circuit board; a display device having a plurality of pixels; and display control circuitry coupled to the printed circuit board. The display control circuitry to: receive an input indicative of a display power mode selection; determine, for the display image at the selected baseline display power mode: a baseline power mode relationship between a baseline number of original pixel values and a baseline number of boosted pixel values used to form a display image; and a value representative of an allowable percentage of distorted original pixel values ($X_i$) associated with the selected display power mode; for each of a plurality of test distorted original pixel percentages ($X_{in}$) between an upper distorted original pixel boundary limit and a lower distorted original pixel boundary limit: select a test distorted original pixel percentage; determine a test mode relationship between the selected test distorted original pixel percentage, a number of test original pixel values and a number of test boosted pixel values; and determine, for the display image, a test PSNR associated with the selected test distorted original pixel value percentage to provide a plurality of test PSNRs; associate a quality loss value with the test distorted original pixel percentage, the quality loss value determined using a Mean Squared Error (MSE) and a histogram of the display image; and select an operating distorted original pixel percentage from the plurality of test distorted original pixel percentages using the determined quality loss value associated with each of the plurality of test distorted original pixel percentages.

Example 35 may include elements of example 34, and the display control circuitry may further cause the display device to operate at the selected operating distorted original pixel value percentage.

Example 36 may include elements of examples 34 or 35 where the baseline power mode relationship between a number of original pixels and a number of boosted pixels used to form a display image may include: a first line segment portion having a slope $K_1$ associated with the baseline power mode relationship between the baseline original pixel values and the baseline boosted pixel values; and a second line segment portion based on the number of baseline original pixel values and the number of baseline boosted pixel values and having a slope $K_0$ given by the formula:

$$K_0 = (255 - K_1*(255-X_i))/X_i.$$

Example 37 may include elements of any of examples 34 through 36 where the test mode relationship comprises a linear relationship in which at least one original pixel value and at least one boosted pixel value are shared between the test mode relationship and the first linear portion.

Example 38 may include elements of any of examples 34 through 37 where the baseline power mode relationship comprises a relationship in which at least one original pixel value and at least one boosted pixel value are shared between the first linear portion and the second linear portion.

Example 39 may include elements of any of examples 34 through 38 where the shared at least one original pixel value comprises a pixel value selected based using the allowable percentage of distorted original pixel values.

Example 40 may include elements of any of examples 34 through 39 where the test mode relationship between the respective test distorted original pixel percentage, the number of test original pixel values and the number of test boosted pixel values may include: a first line segment portion based on the number of test original pixel values and the number of test boosted pixel values and having a slope $K_{1n}$ given by the formula:

$$K_{1n} = (255-(X_{in}*K_0))/(255-X_{in});\text{ and}$$

the second line segment portion having the slope $K_0$ based on the baseline number of original pixel values and the baseline number of boosted pixel values.

Example 41 may include elements of any of examples 34 through 40 where the upper distorted original pixel boundary limit is a value less than $255/K_0$.

Example 42 may include elements of any of examples 34 through 41 where the test mode relationship comprises a linear relationship in which at least one original pixel value and at least one boosted pixel value are shared between the test mode relationship and the baseline power mode relationship.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:
1. An apparatus comprising:
    memory;
    computer readable instructions; and
    processor circuitry to execute the instructions to:
        determine a first relationship between original pixel values and boosted pixel values for a power mode of a display device;
        determine a second relationship based on a baseline allowable percentage and the first relationship;
        determine a plurality of test relationships between an original pixel color value distribution and a boosted pixel color value distribution based on the second relationship, respective ones of the test relationships corresponding to different test distorted pixel percentages;
        determine, for respective ones of the plurality of test relationships, a value indicative of a change in image quality; and select, as an operating distorted pixel percentage value, one of the test distorted pixel percentages based on the values.

2. The apparatus of claim 1, wherein the processor circuitry is to cause a number of pixels to have reduced brightness based on the operating distorted pixel percentage value.

3. The apparatus of claim 1, wherein the processor circuitry is to cause a number of pixels to have a distorted brightness based on the operating distorted pixel percentage value.

4. The apparatus of claim 1, wherein respective power consumption of the respective ones of the test relationships is similar or identical.

5. The apparatus of claim 1, wherein the first relationship is based on a ratio of the boosted pixel values to the original pixel values.

6. The apparatus of claim 1, wherein as the ratio approaches 1:1, distortion in the distorted pixels decreases.

7. The apparatus of claim 1, wherein the test relationship includes a linear relationship in which at least one original pixel value and at least one boosted pixel value are shared between the test relationship and the first relationship.

8. The apparatus of claim 7, wherein the at least one original pixel value includes a pixel value selected using the allowable percentage of distorted pixels.

9. The apparatus of claim 1, wherein the baseline allowable percentage of distorted pixels is based on a composition of an image on the display.

10. The apparatus of claim 1, wherein a range of the plurality of test distorted pixel percentages extends at least one of below or above the baseline allowable percentage of distorted pixels.

11. A non-transitory storage device comprising instructions to cause one or more processors to at least:
   determine a first relationship between original pixel values and boosted pixel values for a power mode of a display device;
   determine a second relationship based on a baseline allowable percentage and the first relationship;
   determine a plurality of test relationships between an original pixel color value distribution and a boosted pixel color value distribution based on the second relationship, respective ones of the test relationships corresponding to different test distorted pixel percentages;
   determine, for respective ones of the plurality of test relationships, a value indicative of a change in image quality; and
   select, as an operating distorted pixel percentage value, at least one of the test distorted pixel percentages based on the values.

12. The storage device of claim 11, wherein the instructions cause the one or more processors to cause a number of pixels to have reduced brightness based on the operating distorted pixel percentage value.

13. The storage device of claim 11, wherein respective power consumption of the respective ones of the test relationships is similar or identical.

14. The storage device of claim 11, wherein the first relationship is based on a ratio of the boosted pixel values to the original pixel values.

15. The storage device of claim 14, wherein as the ratio approaches 1:1, distortion in the distorted pixels decreases.

16. The storage device of claim 11, wherein the instructions cause the one or more processors to cause a display device to operate at the selected operating distorted original pixel value percentage.

17. The storage device of claim 11, wherein the instructions cause the one or more processors to determine the values based on a histogram of an image on the display.

18. The storage device of claim 11, wherein the test relationship includes a linear relationship in which at least one original pixel value and at least one boosted pixel value are shared between the test relationship and the baseline first relationship.

19. The storage device of claim 11, wherein the baseline allowable percentage of distorted pixels is based on a color of an image on the display.

* * * * *